United States Patent Office 3,384,748
Patented May 21, 1968

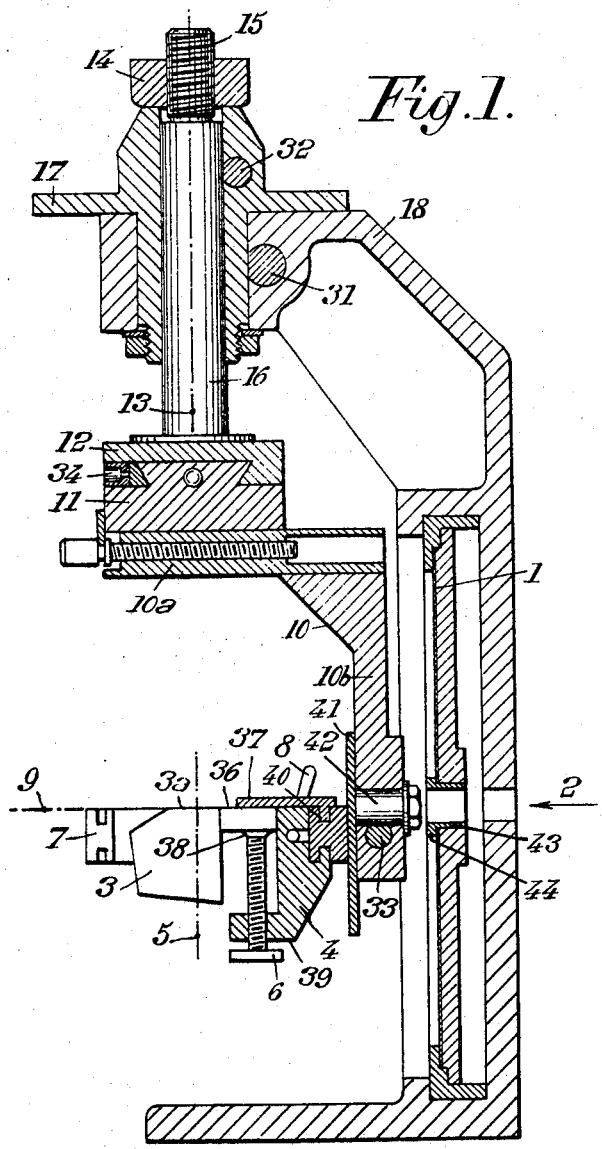

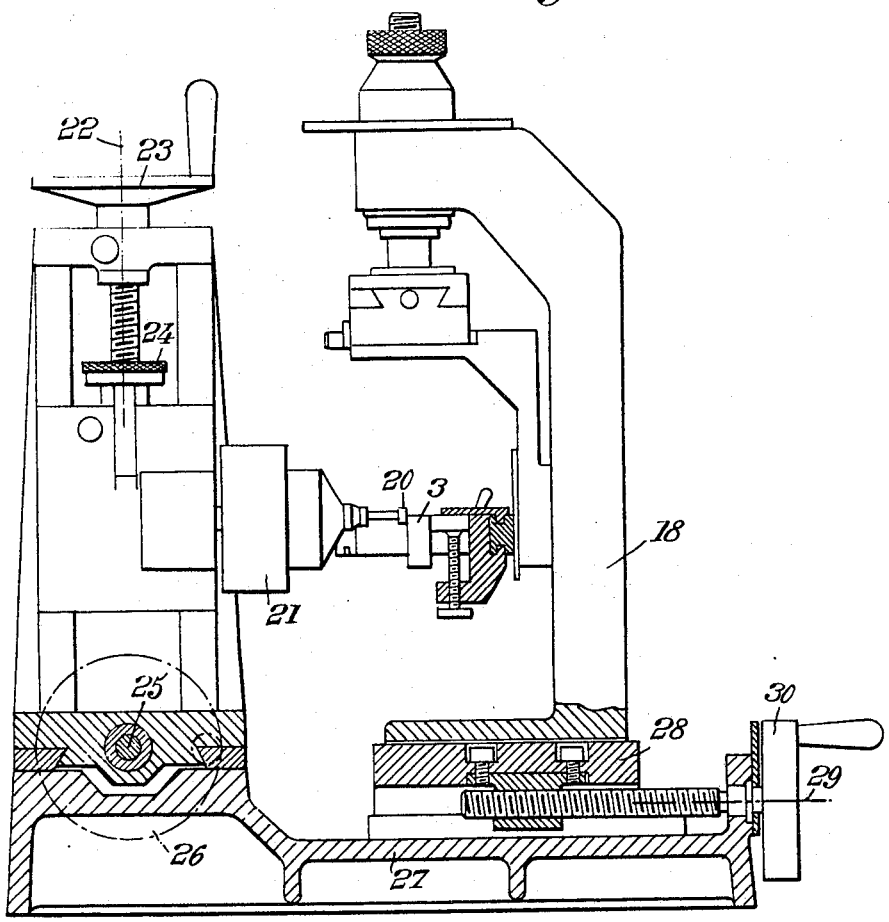

3,384,748
GONIOMETRIC SUPPORTS FOR SUPPORTING
CRYSTAL DURING CRYSTAL ANALYSIS
AND SUBSEQUENT CUTTING
Jacques Rioux, Versailles, and Michel Rodot, Meudon,
France, assignors to Centre National de la Recherche
Scientifique, Paris, France
Filed Mar. 30, 1965, Ser. No. 443,865
Claims priority, application France, Apr. 3, 1964,
969,703
7 Claims. (Cl. 250—51.5)

ABSTRACT OF THE DISCLOSURE

A goniometric support which comprises a frame, a support movably carried by said frame and adapted to be rotatable, preferably about a fixed vertical axis and displaceable in three directions perpendicular to one another, one of said directions being vertical. A ring is mounted on the support and pivotable with respect thereto about a horizontal axis. A crystal holder, slidably and adjustably mounted on the ring, holds a crystal in the area of the centre of the ring. This goniometric support enables the rotation of a crystal, subjected to an X-ray beam, about three axes and within angles at least equal to 270°.

The present invention relates to a goniometric support, or crystal supporting apparatus, which is particularly fit for supporting a crystal in view of the X-ray analysis for its structure, in particular of the determination of its crystallographic ones, for orienting said crystal and for holding said crystal during the subsequent cutting thereof along predetermined planes with respect to said crystallographic axes. Such axes can be defined with a great accuracy for instance by the radio-crystallographic method of Laue.

The known apparatuses or goniometric supports of this kind are inconvenent for the folowing reasons.

Owing to their little size such apparatuses enable only the pre-orientation of very small crystals, the size of which does not exceed about 15 mm.

In addition, the rotations that such apparatuses can impart to the crystal are limited to about ±20°; thus these apparatuses are useful only to achieve the orientation of an already previously approximately oriented crystal with respect to a beam of X-rays.

Finally when the plane of cutting of the crystal has been pre-established as set forth here-above, said crystal must be removed and fixed on an other appropriate support system, previously to the subsequent cutting operation.

When a crystal of a greater size is to be cut the known apparatuses are usually used in the following manner.

A split is taken from the crystal considered, for instance by the cleavage thereof, said split being provided with guide marks (for instance its geometric edges) and fixed on the apparatus in view of its exposure to a beam of X-rays.

The rotations and displacements which are to be imparted to the crystal to bring it in the desired position are then defined by three angles with respect to said guide marks.

The chief object of the present invention is to provide a goniometric support or support apparatus of this kind which is better adapted to meet the requirements of practice than those used heretofore for the same purpose, to avoid the removal of the crystal from its support between the X-ray determination of its cutting planes and the subsequent cutting operation.

Another object of the invention is to provide a supporting apparatus permitting the firm fixation thereon of a crystal of any size and permitting both the pre-orientation of said crystal in any direction with respect to a beam of X-rays and the holding of the so pre-oriented crystal during the subsequent cutting thereof, for instance by means of a conventional milling apparatus.

The apparatus according to the invention comprises a frame, a support carried by said frame, said support being adapted, on the one hand, to be rotatable about a vertical axis, preferably fixed with respect to said frame and, on the other hand, to be displaceable in three directions perpendicular to one another, one of said directions being vertical, said apparatus further comprising a ring pivotally mounted on said support about a horizontal axis and a crystal holder slidably adjustable on the ring.

A crystal supported by said holder may thus be displaced in three directions perpendicular to one another and rotated about three axes perpendicular to one another whereby said cyrstal may be brought practically in any desired position.

Moreover each of said movements can be locked separately. The crystal thus may be locked into any desired position, such position being determined advantageously in function of the Laue spectrum produced by a beam of X-rays, and subjected directly to the action of a milling-cutter when still in place on said supporting apparatus.

According to a preferred embodiment of the invention the whole apparatus, together with the crystal is transferable from the bench of the X-ray apparatus to the bench of a milling apparatus for cutting the crystal, thereby removing any calculation of the rotation angles of the crystals.

Preferably the above mentioned ring is open on the part of its periphery opposite to the point of the pivotable mounting of the ring on said support.

In a practical embodiment of the invention, the ring is open on about a quarter of its periphery. Thus the rotation of the crystal about the axis of the ring through the adjustable sliding of the crystal holder on the ring is limited to about 270°.

With such a construction it is then possible to overcome, when exposing the crystal to a beam of X-rays, the effects of the dead angles caused by the parts of the apparatus itself. Practically, satisfactory X-ray pictures can be obtained for rotations of the crystal of approximately 270° about two of the above mentioned axes and of 360° about the third of said axes. Such limitations and the possible dead angles caused by the parts of the apparatus which pass through the X-rays diffracted by the crystal, are not disturbing owing to the 180° symmetry of the crystals. This symmetry thus permits rotating the crystal of 180° about the concerned axis to avoid such dead angles in the case where the latter would affect the picture obtained and the ease of the determination of the planes of cutting subsequent to a first pre-orientation of the crystal.

A preferred embodiment of the present invention will be hereinafter described with reference to the appended drawings given merely by way of example and in which:

FIG. 1 shows a longitudinal section of a supporting apparatus, according to the invention, for a crystal;

FIG. 2 shows diagrammatically a longitudinal section of the supporting apparatus according to the invention mounted on the batch of a conventional milling apparatus.

With reference to FIG. 1 there is shown a supporting apparatus for a crystal according to a preferred embodiment of this invention. This supporting apparatus comprises a frame 18, a support 10, means 17, 16, 12 and 11 which will be described with more details thereafter for permitting, on the one hand, the rotation of said support about a vertical axis 13 fixed with respect to said support 18 and, on the other hand, the displacement of the support 10 in three directions perpendicular to one another, one of said directions being vertical, said apparatus further comprising a ring 7 carried by the support 10 and pivotable thereon about a horizontal axis 9 and a crystal holder 4 slidably adjustable on the ring 7 which enables the rotations of a crystal 3 about the axis 5 of said ring and which can be locked in position with a clamping handle 8.

Advantageously the support 10 is constituted by a corner member comprising a horizontal part 10a and a vertical part 10b.

The crystal holder is advantageously constituted by a vise 4 guided in an annular groove 40. The ring 40, together with a graduated circular plate 41, the graduations of which cooperate for instance with a vernier scale not represented on the support 10, is advantageously rotatably mounted in the vertical part 10b of the support 10 by means of a pin 42 thereby enabling the rotation of the ring together with the vise 4 about the axis 9 of said pin. A conventional clamping system diagrammatized at 33 permits the locking in position of the ring in any desired position. Such clamping system consists for instance of two members tangential said pin 42 and which can be drawn toward each other by means of a screw for wedging the pin 42, hence the ring 7, in the desired position.

The ring may be open on part of its periphery, for instance on about the quarter of said periphery opposite the pin 42, whereby an easy mounting of the vise 4 together with the crystal 3 on the ring 7 and the possibility for an incident X-ray beam to reach the centre of the ring in most of the positions of the crystal are obtained.

Concerning more particularly the holding of the crystal it is, for instance, glued on a piece 36 of a rigid material which is itself firmly pressed between a flat face 37 of the vise 4 and the extremity 38 of a screw 6 screwed in a part 39 of the vise, opposite said flat face 37.

Concerning the above mentioned means 17, 16, 12 and 11, they are advantageously constituted as follows:

The horizontal part 10a of the support 10 cooperates with a first slide element 11, said slide element 11 engaging itself into a second slide element 12 rigid with a rod 16 axially and vertically slidable in a sleeve 17, said sleeve 17 being rotatively fit in a corresponding vertical bore of the support 18. The rotations of the rod 16 enable the rotations of the crystal about the axis 13. These rotations may be locked by a clamping device 31 similar to the clamping device 33.

The sliding of the support in the slide element 11 ensures the displacement of said support 10 in a first horizontal direction.

The slide element 11 is itself slidable in a perpendicular direction in said second slide element 12, thereby providing the displacement of the support 10 in a second horizontal direction.

Finally the displacement of the support in the third vertical direction is ensured by the axial slidable mounting of rod 16 in the sleeve 17.

The displacement of the support 10 in any of these directions, for instance on about 3 mm., can be controlled in a similar manner to that shown in FIG. 1 in connection with rod 16. To that effect rod 16 is provided at its upper extremity with a threaded head 15 engaging a milled knob 14 applied against a part fixed in the concerned direction, for instance the upper portion of the sleeve 17.

Advantageously the elements 17, 13, 12 and 11 can be respectively locked in a chosen position, for instance by wedges 43 in connection with the slide elements 11 and 12 or with clamping members 32, similar to the clamping members 33, in connection with rod 16.

It will thus be appreciated that the crystal 3 may be translated in three perpendicular directions with respect to an X-ray beam whereby the impact point of said X-ray beam on the crystal may be directed on a point thereof free of any apparent physical defect (in particular the crystal should be well polished at this point).

It will also be appreciated that the crystal may be rotated about three axes, namely the axes 13, 9 and 5.

In particular, the axis 5 can be brought perpendicular to the axes 13 and 9 by rotating the ring 7 of 90° about its axis 9 with respect to the position of said ring as shown in FIG. 1.

Advantageously the support 18 is provided with a flat surface 1 on which may be brought a sensitive surface and with a central aperture 43 in which is fit a collimator 44 for controlling the formation of X-ray parallel beams in the direction shown by the arrow 2, said X-rays being generated by a source not represented. To bring for instance the face 3a of the crystal 3 to face the X-ray beam 2 the ring 7 must be rotated of 90° about the axis 9 and the rod 16, carrying the support 10, of 90° about the axis 13.

Thus the crystal can be brought in a position such that the spectrum of Laue obtained on the sensitive plate 1 has a symmetry corresponding to the desired orientation through the different rotations and translations above described. The crystal is then locked in this position by the clamping means 31, 32, 33 and the whole supporting apparatus or goniometric support can be brought on the optic bench 28, translatable on the base 27 of a conventional milling apparatus, as shown in FIG. 2. This milling apparatus comprises a milling head 20 which can be brought in contact with the desired face of the crystal 3, means being provided in a conventional manner in said milling apparatus for ensuring the relative motions of the crystal 3 and of the milling head 20 in three directions perpendicular to one another.

The relative displacement in a vertical direction 22 of the milling head 20 is ensured by a differential bolt-nut system 23–24, the rapid motions of said milling head along axis 22 being controlled by a winch 23, and the slow motions being controlled by a screw 24; a similar device controlled by a winch 26 ensures the relative motions of the milling head 20 with respect to the crystal 3 in a first horizontal direction along axis 25; finally the displacements of the optic bench 28 supporting the goniometric support 18 in the second horizontal direction along axis 29 perpendicular to the above recited directions are controlled by a winch 30.

The apparatus according to the invention thus permits a very easy orientation of crystals of any size (for instance of a size which can be inscribed in a cylinder having a diameter of 30 mm. and a height of 100 mm.) and their firm holding during the subsequent cutting step.

Of course the invention includes all alternatives for instance those where the crystal pre-oriented by said supporting apparatus is subjected to treatments other than the cutting of said crystal along pre-determined planes.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What we claim is:

1. For use in the X-ray analysis of the structure of a crystal, a supporting apparatus capable of holding said crystal for the subsequent cutting thereof, which comprises, in combination, a frame, a support, means for movably mounting said support with respect to said frame, said means being adapted to permit rotation of said support about a vertical axis and rectilinear displacements of said support, with respect to said frame, in three directions perpendicular to one another, one of said directions being vertical, a ring pivotally carried by said support about a horizontal diameter of said ring, the mean position of said ring being on said vertical axis, means for locking said ring with respect to said support, a crystal holder slidably adjustable on said ring, adapted to hold said crystal in the area of the centre of said ring, and means for locking said holder on said ring.

2. For use in the X-ray analysis of the structure of a crystal, a supporting apparatus capable of holding said crystal for the subsequent cutting thereof, which comprises, in combination, a frame, a support, means for movably mounting said support with respect to said frame, said means being adapted to permit rotation of said support about a vertical axis fixed with respect to said frame and rectilinear displacements of said support with respect to said frame in three directions perpendicular to one another, one of said directions being vertical, a ring pivotally carried by said support about a horizontal diameter of said ring, the mean position of said ring being on said vertical axis, means for locking said ring with respect to said support, a crystal holder slidably adjustable on said ring, adapted to hold said crystal in the area of the centre of said ring, and means for locking said holder on said ring.

3. For use in the X-ray analysis of the structure of a crystal, a supporting apparatus capable of holding said crystal for the subsequent cutting thereof, which comprises, in combination, a frame, a support, means for movably mounting said support with respect to said frame, said means comprising a sleeve pivotally mounted on said frame about a vertical axis, means for locking said sleeve with respect to said frame, a vertical rod vertically displaceable in said sleeve, means for locking said vertical rod with respect to said sleeve, a member carried by said vertical rod and displaceable relative thereto in a first horizontal direction, means for locking said member with respect to said vertical rod, said support being carried by said member and displaceable relative thereto in a second horizontal direction perpendicular to the first horizontal direction, and means for locking said support with respect to said member, a ring pivotally carried by said support about a horizontal axis, the mean position of the center of said ring being on the vertical axis of said vertical rod, means for locking said ring with respect to said support, a crystal holder slidably adjustable on said ring, and means for locking said holder on said ring.

4. For use in the X-ray analysis of the structure of a crystal, a supporting apparatus capable of holding said crystal for the subsequent cutting thereof, which comprises, in combination, a frame having an orifice along a horizontal axis, a collimator located in said orifice for collimating a beam of X-rays, a sensitive plate applied against an inner surface of said frame perpendicular to the beam of X-rays, said sensitive plate having a central aperture corresponding to said orifice of said frame and permitting the passage of the beam of X-rays, a support, means for movably mounting said support with respect to said frame, means comprising a sleeve pivotally mounted on said frame about a vertical axis, means for locking said sleeve with respect to said frame, a vertical rod vertically displaceable in said sleeve, a milled knob for controlling the vertical displacement of said vertical rod, said milled knob engaging one end of said vertical rod and being supported by said sleeve, means for locking said vertical rod with respect to said sleeve, a member carried by said vertical rod and displaceable relative thereto in a first horizontal direction, means for locking said member with respect to said vertical rod, said support being carried by said member and displaceable relative thereto in a second horizontal direction perpendicular to the first perpendicular direction and means for locking said support with respect to said member, a ring pivotally carried by said support about a horizontal axis, means for locking said ring with respect to said support, a crystal holder slidably adjustable on said ring, and means for locking said holder on said ring.

5. A supporting apparatus according to claim 4 wherein said ring is open on part of its periphery.

6. A supporting apparatus for a crystal for use in the X-ray analysis of its structure and for the holding of said crystal during the subsequent cutting thereof which apparatus comprises, a frame, a support movable with respect to said frame, first means adapted to permit rectilinear displacements of said support with respect to said frame in three directions perpendicular to one another, second means adapted to permit the rotation of said support with respect to said frame about an axis, a ring member supported, pivotable about one of its diameters, by said support, said diameter being perpendicular to said axis, a crystal holder slidably adjustable on said ring member, adapted to hold said crystal in the area of the centre of said ring member, said first means being devised such that they permit said axis and diameter to be brought in positions where they converge into the centre of said ring member.

7. A supporting apparatus according to claim 6 wherein said axis is vertical and its orientation fixed with respect to said frame.

References Cited

UNITED STATES PATENTS

| | | | |
|---|---|---|---|
| 359,379 | 3/1887 | Ballou | 269—60 |
| 776,553 | 12/1904 | Scoggins | 269—71 |
| 1,216,600 | 2/1917 | Paschall | 269—60 |
| 3,160,748 | 12/1964 | Chan | 250—51.5 |

RALPH G. NILSON, *Primary Examiner.*

A. L. BIRCH, *Assistant Examiner.*